US012781064B2

(12) United States Patent
Herckens et al.

(10) Patent No.: US 12,781,064 B2
(45) Date of Patent: Nov. 3, 2026

(54) POLYTHIOPHENE/POLYANION COMPOSITIONS

(71) Applicant: Agfa-Gevaert NV, Mortsel (BE)

(72) Inventors: Roald Herckens, Mortsel (BE); Johan Loccufier, Mortsel (BE)

(73) Assignee: Agfa-Gevaert NV, Mortsel (BE)

( * ) Notice: Subject to any disclaimer, the term of this patent is extended or adjusted under 35 U.S.C. 154(b) by 501 days.

(21) Appl. No.: 18/566,238

(22) PCT Filed: Jun. 3, 2022

(86) PCT No.: PCT/EP2022/065198
§ 371 (c)(1),
(2) Date: Dec. 1, 2023

(87) PCT Pub. No.: WO2022/254012
PCT Pub. Date: Dec. 8, 2022

(65) Prior Publication Data

US 2024/0279489 A1 Aug. 22, 2024

(30) Foreign Application Priority Data

Jun. 4, 2021 (EP) ..................................... 21177790

(51) Int. Cl.

| | |
|---|---|
| ***C09D 5/24*** | (2006.01) |
| ***C08L 25/18*** | (2006.01) |
| ***C08L 65/00*** | (2006.01) |
| ***C09D 125/18*** | (2006.01) |
| ***C09D 165/00*** | (2006.01) |

(Continued)

(52) U.S. Cl.
CPC ................ *C09D 5/24* (2013.01); *C08L 25/18* (2013.01); *C08L 65/00* (2013.01); *C09D 125/18* (2013.01); *C09D 165/00* (2013.01); *H01G 11/26* (2013.01); *H01G 11/48* (2013.01); *H01G 11/86* (2013.01);
(Continued)

(58) Field of Classification Search
None
See application file for complete search history.

(56) References Cited

U.S. PATENT DOCUMENTS 3,306,871 A 2/1967 Miller
5,300,575 A * 4/1994 Jonas ....................... G03C 1/89 525/186

(Continued)

FOREIGN PATENT DOCUMENTS

CN 112047921 A 12/2020
JP 2006/244994 A 9/2006

(Continued)

OTHER PUBLICATIONS

European Patent Office, International Search Report in International Patent Application No. PCT/EP2022/065198, mailed Sep. 27, 2022, 4 pp.

(Continued)

*Primary Examiner* — Fred M Teskin

(74) *Attorney, Agent, or Firm* — Leydig, Voit & Mayer, Ltd.

(57) ABSTRACT

A conductive polymer dispersion comprising a polythiophene and a polyanion, characterized in that the polyanion is a homo- or copolymer of a monomer unit according to Formula (I), wherein any of $R_1$ to $R_5$ is selected from the group consisting of hydrogen, a halogen, an ether and a substituted or unsubstituted alkyl group with the proviso that at least one of $R_1$ to $R_5$ is a substituent according to Formula (II), wherein L represents a divalent linking group having less than (20) carbon atoms; n represents 0 or 1; $R_6$ and $R_7$ are independently selected from the group consisting of hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group; any of L, $R_6$ and $R_7$ may represent the necessary atoms to form a 5 to 8 membered ring; M represents hydrogen or a counterion to compensate the negative charge of the sulfonate group; the dashed line represents a covalent bond to the phenyl ring of Formula (I).

Formula (I)

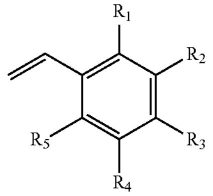

Formula (II)

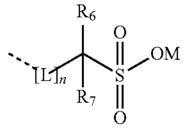

15 Claims, No Drawings

(51) Int. Cl.

| | |
|---|---|
| ***H01G 11/26*** | (2013.01) |
| ***H01G 11/48*** | (2013.01) |
| ***H01G 11/86*** | (2013.01) |
| *C08K 5/053* | (2006.01) |

(52) U.S. Cl.
CPC ........ *C08K 5/053* (2013.01); *C08K 2201/001* (2013.01); *C08L 2201/50* (2013.01)

(56) References Cited

U.S. PATENT DOCUMENTS

| | | | | |
|---|---|---|---|---|
| 8,721,929 | B2 * | 5/2014 | Loevenich .............. | C08L 25/16 252/500 |
| 2015/0279503 | A1 | 10/2015 | Scheel et al. | |
| 2016/0064113 | A1 | 3/2016 | Hatakeyama et al. | |
| 2018/0068801 | A1 | 3/2018 | Uka et al. | |
| 2018/0240564 | A1 | 8/2018 | Hatakeyama et al. | |

FOREIGN PATENT DOCUMENTS

| | | | |
|---|---|---|---|
| JP | 2020/183493 | A | 11/2020 |
| JP | 6785390 | B1 | 11/2020 |
| KR | 102211924 | B1 | 2/2021 |

OTHER PUBLICATIONS

European Patent Office, Written Opinion in International Patent Application No. PCT/EP2022/065198, mailed Sep. 27, 2022, 5 pp.

* cited by examiner

POLYTHIOPHENE/POLYANION COMPOSITIONS

CROSS-REFERENCE TO RELATED APPLICATIONS

This patent application is the U.S. national stage of copending International Patent Application No. PCT/EP2022/065198, filed Jun. 3, 2022, which claims the benefit of European Patent Application No. 21177790.9, filed Jun. 4, 2021.

TECHNICAL FIELD OF THE INVENTION

The present invention relates to novel polythiophene/polyanion compositions and their use in various applications, such as for example polymer capacitors.

BACKGROUND ART FOR THE INVENTION

Environmental concerns over greenhouse gas emissions have stimulated the demand for battery electric and (plug in) hybrid electric vehicles with increasing battery capacities. Control units in these vehicle electronics contain several so-called polymer capacitors.

Due to operation at higher voltages and higher converter frequencies, the capacitors may be exposed to high temperatures. Therefore, the reliability of these capacitors at high temperatures is one of the important characteristics of these devices in electric vehicles.

Polymer hybrid aluminium-electrolytic capacitors are often applied in this field. These capacitors consist of an etched aluminium/aluminium oxide ($Al/Al_2O_3$) foil which serves as the electrode and the dielectric layer, covered by a conductive polymer layer which functions as the counter electrode. Poly(3,4-ethylenedioxythiophene):poly(styrene sulfonic acid) (PEDOT:PSS) is commonly used, a conductive polymer complex which is coated on the $Al/Al_2O_3$ substrate by dip coating from an aqueous dispersion. The temperature stability of the conductive polymer film has a direct influence on the reliability of the capacitors at high temperatures. For PEDOT:PSS the polyanion PSS is associated with a degradation at higher temperatures, therefore limiting the reliability of the conductive polymer layer.

The manufacturing of these capacitors is performed by the dip coating of a capacitor element in the aqueous dispersion of PEDOT:PSS. These dispersions generally have a pH of 1.5-2 due to the acidity of the PSS polymer. The $Al_2O_3$ layer which functions as the dielectric layer of the capacitor, however, is stable in a pH range of 4 to 8.5. Therefore, the conductive polymer dispersions are usually neutralized with a base up to a pH within this pH range. For PEDOT:PSS dispersions, however, this leads to an increase in surface resistance of the resultant PEDOT:PSS layers. A higher surface resistance of the polymer layer is associated with an increase in the equivalent series resistance (ESR) of the capacitor.

An additional aspect of the manufacturing of these capacitors is the penetration of the conductive polymer particles in the $Al/Al_2O_3$ foil. To increase the surface area an etched foil of Al is used, which is then anodized to provide a thin layer of $Al_2O_3$. This process creates a porous $Al/Al_2O_3$ substrate, which is dip coated with the aqueous PEDOT:PSS dispersion. The particle size of the conductive polymer particles therefore determines the ability of the polymer to penetrate the pores of the $Al/Al_2O_3$ substrate. A lower median particle size of the conductive polymer dispersion typically results in a better coating. Moreover, the particle size preferably remains small within the stable pH range of the aluminium oxide material mentioned above.

PSS is commonly used as dispersant for PEDOT in an aqueous dispersion.

US2018/240564 (Shin Etsu Chemicals) describes, as alternative for PSS, a so-called dopant polymer with a benzamide or acrylamide structure and sulfonyl groups. These polymers used alone or in combination with PSS improve the filterability and coatability of the resultant aqueous PEDOT dispersions.

KR102211924 (Yonsei University) discloses copolymers of styrene sulfonic acid and fluorinated styrene or acrylate monomers. Their use improves the flexibility, solution stability and coatability of the resultant PEDOT dispersions.

JP6785390 (Sagami Central Chemical Research Center) discloses the use of styrene sulfonic acid and vinyl alcohol to prepare copolymer dispersants for PEDOT. These copolymers show an improved film formation and a lower hygroscopicity compared to PSS. However, a lower adhesion is observed.

In JP2020/183493 (Tosoh), a copolymer of acrylic sulfonate monomers and styrene sulfonic acid is described. With such copolymers smaller PEDOT:polyanion particles are obtained.

US2018/068801 (Panasonic) discloses a so-called acrylic type polymer dopant prepared from three different monomers respectively having a sulfonate group, a carboxy group and a hydroxyl group. These polymer dopants are used for PEDOT dispersions which are used to prepare polymer capacitors.

In US2020/279692 (Panasonic) the heat resistance of polymer capacitors is improved by forming different conductive layers on top of each other and the application of a so-called treatment liquid between each conductive layer. The treatment liquid comprises small molecule additives such as naphthalenesulfonic acid. In US2020/211785 (Panasonic) such a treatment liquid comprises aromatic carboxylic acids.

US2015/0279503 (Heraeus Precious Metals) discloses a process for the production of a capacitor wherein a dispersion comprising a dispersing agent and complexes of polythiophenes and polyanions wherein the weight ratio of polythiophenes:polyanions in the dispersion is greater than 0.5.

A conductive polymer dispersion which improves the temperature stability of the conductive polymer layers formed therewith may lead to an improved high temperature reliability of a polymer capacitor. In addition, if the dispersion may be used in a pH window of 4 to 8.5 without an increased particle size or increased surface resistance of the resultant conductive polymer layers, the ESR of the polymer capacitors may also be improved. Finally, a dispersion with a lower median particle size will further improve the ESR of the resulting capacitor due to an improved penetration of conductive polymer particles in the porous substrate.

Therefore, there is a need for PSS alternatives to prepare stable aqueous PEDOT dispersions. It has been found that using PSS alternatives with a linking group between the styrene group and the sulfonic acid group improves the thermal stability of a conductive polymer layer, enables processing at a higher pH level and lowers the particle size of the conductive polymer dispersion without a significant impact on other properties of the conductive polymer layer.

SUMMARY OF THE INVENTION

It is an object of the invention to provide a dispersion comprising a conductive polymer wherewith polymer capacitors having an improved high temperature reliability and Equivalent Surface Resistance (ESR) may be realized.

The object of the invention is realized by dispersion as defined in claim 1.

Further objects of the invention will become apparent from the description hereinafter.

DETAILED DESCRIPTION OF THE INVENTION

Definitions

The term "monofunctional" in e.g. monofunctional polymerizable compound means that the polymerizable compound includes one polymerizable group.

The term "difunctional" in e.g. difunctional polymerizable compound means that the polymerizable compound includes two polymerizable groups.

The term "polyfunctional" in e.g. polyfunctional polymerizable compound means that the polymerizable compound includes more than two polymerizable groups.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_2$ to $C_6$-alkenyl group.

Unless otherwise specified a substituted or unsubstituted alkynyl group is preferably a $C_2$ to $C_6$-alkynyl group.

Unless otherwise specified a substituted or unsubstituted alkaryl group is preferably a phenyl or naphthyl group including one, two, three or more $C_1$ to $C_6$-alkyl groups.

Unless otherwise specified a substituted or unsubstituted aralkyl group is preferably a $C_7$ to $C_{20}$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulfur atoms, selenium atoms or combinations thereof.

Unless otherwise specified a substituted or unsubstituted alkylene group is preferably a $C_1$ to $C_6$-alkylene group.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms.

Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester, amide, amine, ether, thioether, ketone, aldehyde, sulfoxide, sulfone, sulfonate ester, sulphonamide, —Cl, —Br, —I, —OH, —SH, —CN and —$NO_2$.

Conductive Polymer Dispersion

A dispersion comprising a conductive polymer is referred to herein as a conductive polymer dispersion.

The conductive polymer dispersion according to the present invention comprises a polyanion and a conductive polymer as described below.

As described below the polythiophene is preferably prepared in the presence of the polyanion. The polyanion may stabilize the polythiophene thereby forming polythiophene/polyanion particles dispersed in the dispersion medium, preferably water.

The conductive polymer dispersion is preferably an aqueous dispersion.

The mass ratio of poly(thiophene) and polyanion ranges from 1:10 to 10:1, more preferably from 1:5 to 5:1, most preferably from 1:3 to 3:1.

A dispersion medium of the conductive polymer dispersion is water, a water-soluble organic solvent, or mixtures thereof. Preferred organic solvents are protic organic solvents, such as alcohols or acids. The dispersion medium is preferable water.

The conductive polymer dispersion may comprise other ingredients such as for example dispersing agents.

The conductive polymer dispersion is preferably prepared as described below.

Polyanion

The conductive polymer dispersion comprises a polyanion, which is a homo- or copolymer of a monomer according Formula I, Formula I

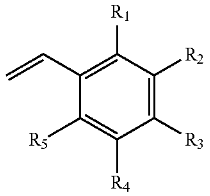

wherein any of $R_1$ to $R_5$ is selected from the group consisting of hydrogen, a halogen, an ether and a substituted or unsubstituted alkyl group with the proviso that at least one of $R_1$ to $R_5$ is a substituent according to Formula II, Formula II

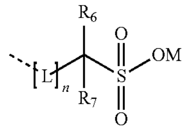

wherein L represents a divalent linking group having less than 20 carbon atoms;

n represents 0 or 1;

$R_6$ and $R_7$ are independently selected from the group consisting of hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group;

any of L, $R_6$ and $R_7$ may represent the necessary atoms to form a 5 to 8 membered ring;

M represents hydrogen or a counterion to compensate the negative charge of the sulfonate group;

the dashed line represents a covalent bond to the phenyl ring of Formula I.

L is preferably selected from the group consisting of substituted or unsubstituted alkylene group, a substituted or unsubstituted alkenylene group and a substituted or unsubstituted alkynylene group, a substituted or unsubstituted alkylene group being more preferred.

L is preferably a substituted or unsubstituted $C_1$ to $C_{10}$ alkylene group, more preferably a substituted or unsubstituted $C_1$ to $C_5$ alkylene group.

Preferably, n represents 0.

$R_6$ and $R_7$ are preferably independently selected from the group consisting of hydrogen and a substituted or unsubstituted alkyl group, hydrogen being most preferred.

In a preferred embodiment only one of $R_1$ to $R_5$ is a substituent represented by Formula II.

In another preferred embodiment one of $R_2$, $R_3$ and $R_4$ is a substituent represented by Formula II.

In still another preferred embodiment all substituents which are not represented by Formula II are hydrogen.

In a particularly preferred embodiment, $R_3$ is a substituent represented by Formula II and $R_1$, $R_2$, $R_4$ and $R_5$ represent hydrogen.

M preferably represents a quaternary ammonium group, $H^+$ or $Na^+$, most preferably M represents $H^+$.

Typical monomers according to Formula I are disclosed in Table 1.

TABLE 1

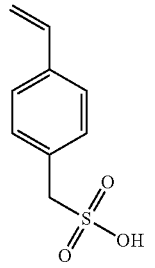

Monomer I-1

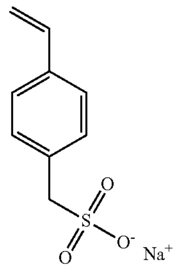

Monomer I-2

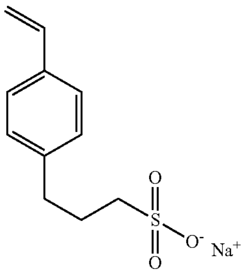

Monomer I-3

TABLE 1-continued

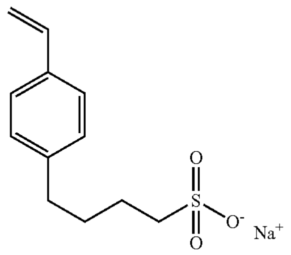 [SMILES: C=Cc1ccc(CCCCS(=O)(=O)[O-])cc1 ; [Na+]]

Monomer I-4

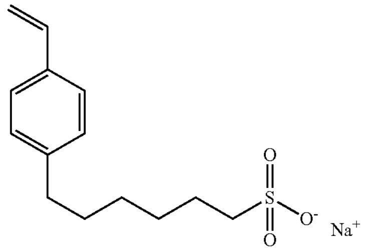 [SMILES: C=Cc1ccc(CCCCCCS(=O)(=O)[O-])cc1 ; [Na+]]

Monomer I-5

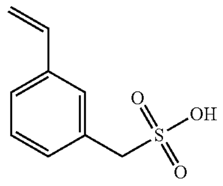

Monomer I-6

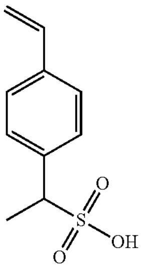

Monomer I-7

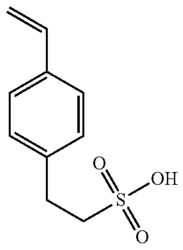

Monomer I-8

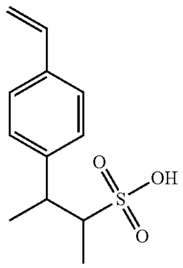 [SMILES: C=Cc1ccc(C(C)C(C)S(=O)(=O)O)cc1]

Monomer I-9

TABLE 1-continued

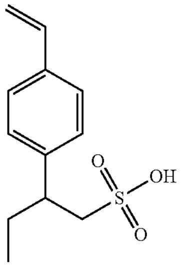 [SMILES: C=Cc1ccc(C(CC)CS(=O)(=O)O)cc1]

Monomer I-10

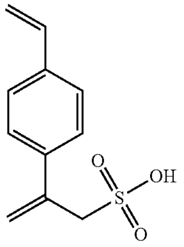

Monomer I-11

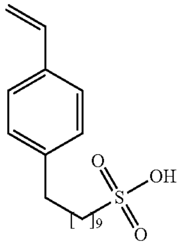

Monomer I-12

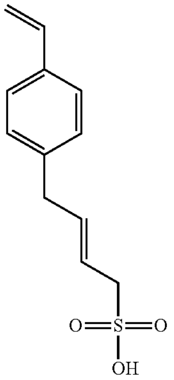 [SMILES: C=Cc1ccc(C/C=C/CS(=O)(=O)O)cc1]

Monomer I-13

The polyanion may be a copolymer of a monomer according to Formula I and at least one other monomer.

In such a copolymer, the amount of monomers according to Formula I is preferably at least 25 mol %, more preferably at least 50 mol %, most preferably at least 75 mol %, particularly preferred at least 90 mol %, all relative to the total amount of monomer units of the copolymer.

Copolymers with styrene sulfonic acid are particularly preferred copolymers.

Homopolymers of monomers according to Formula I are however most preferred.

The weight average molecular weight of the polyanion (Mw) is preferably from 1 000 to 1 000 000 Da, more preferably from 50 000 to 500 000 Da, most preferably from 100 000 to 300 000 Da.

Typical polyanions according to the invention are shown in Table 2.

TABLE 2

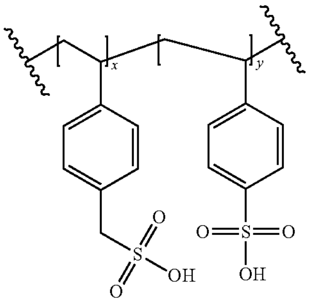

Polyanion-1

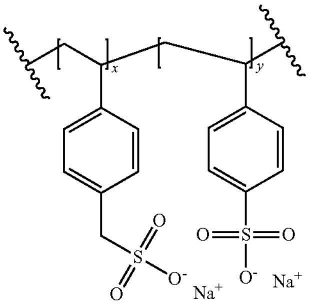

Polyanion-2

X+Y is 1 and X is preferably from 0.25 to 1, more preferably from 0.50 to 1, most preferably from 0.75 to 1, particularly preferred from 0.9 to 1.

In addition to the polyanion described above, the conductive polymer dispersion may comprise one or more other polyanions. For example, the polyanion described above may be combined with PSS.

Conductive Polymer

The conductive polymer dispersion comprises a conductive polymer.

The conductive polymer is preferably a polythiophene.

Such a polythiophene typically has a positive charge located on the main chain of the polymer. The positive charge is preferably, at least partially, compensated by an anion.

When the anion is covalently bound to the polymer, the polymer is then often referred to as a self-doped polymer or a intrinsically conductive polymers. The monomers used to make such self-doped polymers, i.e. comprising an anionic group, are also referred to as self-doped monomers.

When the anion is a separate compound, the polymer is then typically referred to as a foreign-doped polymer or an extrinsically conductive polymer. Anions added as separate compounds are preferably polyanions.

Extrinsically Conductive Polymer

The conductive polymer dispersion comprises an extrinsically conductive polymer.

An extrinsically conductive polymer as referred to herein has a positive charge located on the main chain, which is at least partially compensated by anions not covalently bound to the polymer.

In the present invention, the cationic charge of the extrinsically conductive polymer is at least partially compensated by a polyanion as described above.

The extrinsically conductive polymer is preferably a polythiophene. The polythiophene may be a homopolymer or a copolymer.

Preferred foreign-doped polythiophenes are disclosed in EP-A 440957, page 2, line 46 to page 3, line 14;

A preferred polythiophene is represented by Formula III,

Formula III

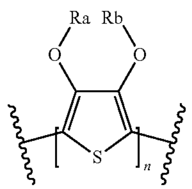

wherein $2<n\leq 100$ $R_a$ and $R_b$ independently represents hydrogen, a substituted or unsubstituted $C_1$-$C_4$ alkyl group, or together form a substituted or unsubstituted $C_1$-$C_4$ alkylene group or a substituted or unsubstituted $C_3$-$C_{10}$ cycloalkylene group.

Preferably, n is an integer from 3 to 50, more preferably from 4 to 20.

Preferably, $R_a$ and $R_b$ independently represent an unsubstituted ethylene group, an unsubstituted methylene group, an optionally alkyl-substituted methylene group, an optionally $C_{1-12}$ alkyl- or phenyl-substituted ethylene group, an unsubstituted 1,3-propylene group or an unsubstituted 1,2-cyclohexylene group.

A preferred polythiophene is a homopolymer or copolymer of a 3,4-dialkoxy-thiophene of which the two alkoxy groups together form an optionally substituted oxy-alkylene-oxy bridge selected from the group consisting of: 3,4-methylenedioxy-thiophene, 3,4-ethylenedioxythiophene, 3,4-propylene-dioxythiophene, 3,4-butylenedioxythiophene and derivatives thereof.

Such polymers are disclosed in Handbook of Oligo- and Polythiophenes Edited by D. Fichou, Wiley-VCH, Weinheim (1999); by L. Groenendaal et al. in Advanced Materials, volume 12, pages 481-494 (2000); L. J. Kloeppner et al. in Polymer Preprints, volume 40(2), page 792 (1999); P. Schottland et al. in Synthetic Metals, volume 101, pages 7-8 (1999); and D. M. Welsh et al. in Polymer Preprints, volume 38(2), page 320 (1997).

A particular preferred extrinsically conductive polymer is polyethylene-dioxythiophene (PEDOT), a homopolymer of 3,4-ethylene-dioxythiopene (EDOT).

Intrinsically Conductive Polymer

In the method of preparing a polymer capacitor described below, an intrinsically conductive polymer may also be used in combination with the extrinsically conductive polymer described above.

Preferably such an intrinsically conductive polymer is used as a separate polymer conductive dispersion besides the polymer conductive dispersion including the extrinsically conductive polymer and the polyanion described above.

An intrinsically conductive polymer as referred to herein means that it has a positive charge located on the main chain that is at least partially compensated by anions covalently bound to the polymer.

Such intrinsically conductive polymers are for example disclosed in EP-A 1122274.

Preferred intrinsically conductive polymers are thiophene homo- or co polymers of a monomer according to the Formula IV, Formula IV

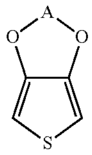

wherein

A represents a substituted or unsubstituted $C_1$ to $C_5$ alkylene bridge further functionalized with at least one functional group selected from the group consisting of a sulfonic acid or salt thereof, a phosphonic acid or salt thereof, a phosphate ester or salt thereof, a sulfate ester or salt thereof and a carboxylic acid or salt thereof, A in Formula IV preferably represents a $C_2$-alkylene bridge.

More preferred intrinsically conductive polymers are thiophene (co-)polymers of a monomer according to the Formula V, Formula V

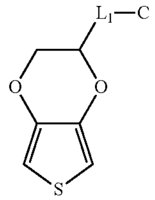

wherein $L_1$ represents a divalent linking group comprising 1 to 15 carbon atoms, and C represents a functional group selected from the group consisting of a sulfonic acid or salt thereof, a phosphonic acid or salt thereof, a phosphate ester or salt thereof, a sulfate ester or salt thereof and a carboxylic acid or salt thereof.

C preferably represents a sulfonic acid or salt thereof.

A particularly preferred intrinsically conductive polymer is a thiophene homo- or copolymer including a monomeric unit according to the Formula VI, Formula VI

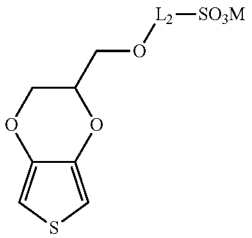

wherein $L_2$ represents a divalent linking group comprising no more than 10 carbon atoms, M represents a hydrogen or a counterion to compensate the negative charge of the sulfonate group.

Typical self-doped monomers according to Formula IV are shown in Table 3.

TABLE 3

| Chemical Structure | Monomer |
|---|---|
| 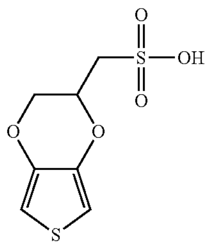 [SMILES: O=S(=O)(O)CC1COc2cscc2O1] | Monomer IV-1 |
| 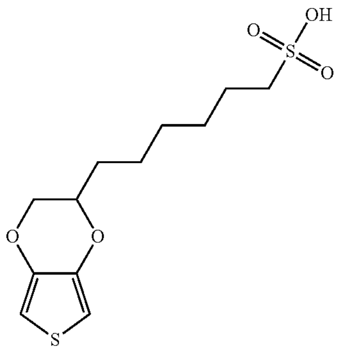 [SMILES: O=S(=O)(O)CCCCCCC1COc2cscc2O1] | Monomer IV-2 |
| 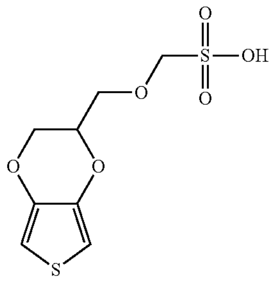 [SMILES: O=S(=O)(O)COCC1COc2cscc2O1] | Monomer IV-3 |
| 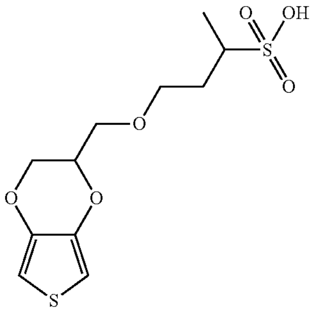 [SMILES: CC(CCOCC1COc2cscc2O1)S(=O)(=O)O] | Monomer IV-4 |
| 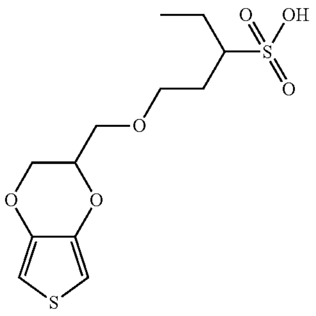 [SMILES: CCC(CCOCC1COc2cscc2O1)S(=O)(=O)O] | Monomer IV-5 |

TABLE 3-continued

| Chemical Structure | Monomer |
|---|---|
| 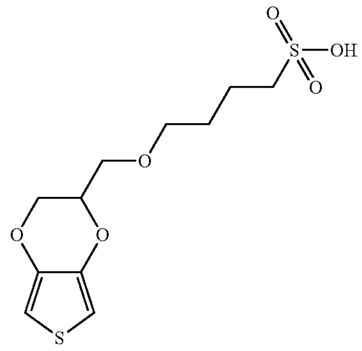 [SMILES: O=S(=O)(O)CCCCOCC1COc2cscc2O1] | Monomer IV-6 |
| 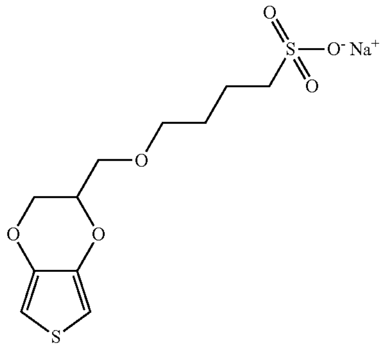 | Monomer IV-7 |
| 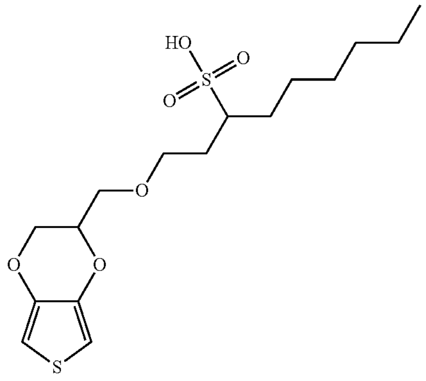 [SMILES: CCCCCCC(CCOCC1COc2cscc2O1)S(=O)(=O)O] | Monomer IV-8 |

Preparation of the Conductive Polymer

The polythiophene polymers are preferably prepared by oxidative polymerization of thiophene monomers in an aqueous medium.

In case of foreign-doped polythiophenes, the oxidative polymerization is preferably carried out in the presence of a polyanion.

The concentration of the thiophene monomer in the aqueous phase medium is preferably in a range from 0.1 to 25 wt %, preferably in a range from 0.5 to 10 wt %, all relative to the total weight of the aqueous reaction medium.

Suitable oxidizing agents are iron(III)-salts, such as $FeCl_3$, and iron(III)-salts of aromatic and aliphatic sulfonic acids; $H_2O_2$; $K_2Cr_2O_7$; alkali metal perborates; alkali metal or ammonium persulfates; and mixtures thereof.

Further suitable oxidants are described, for example, in Handbook of Conducting Polymers (Ed. Skotheim, T. A.), Marcel Dekker: New York, 1986, Vol. 1, pages 46-57.

Particularly preferred oxidizing agents are salts of a peroxydisulfate, in particular $K_2S_2O_8$, $Na_2S_2O_8$; iron(III)-salts, in particular iron(III) chloride; or a combination thereof.

A mixture of salts of a peroxydisulfate and at least one further compound that catalyzes the cleavage of the peroxydisulfate, such as an Fe(III)-salt, is particular preferred.

According to a particularly preferred embodiment the oxidizing agent is a mixture of $Fe_2(SO_4)_3$ and $Na_2S_2O_8$.

There are different ways for preparing the aqueous reaction medium. The thiophene monomer can be dissolved or dispersed in the aqueous reaction medium followed by the addition of the oxidizing agent(s), which can also be dissolved or dispersed in an aqueous phase, or the oxidizing agent(s) is/are first dissolved or dispersed in the aqueous reaction medium, followed by the addition of the thiophene monomer, which can also be dissolved or dispersed in an aqueous phase.

If more than one oxidizing agent is used, for example a mixture of $Fe_2(SO_4)_3$ and $Na_2S_2O_8$, it is furthermore possible to first mix one of these components with the thiophene monomer, for example $Fe_2(SO_4)_3$, in the aqueous reaction medium followed by the addition of the second oxidizing agent, for example $Na_2S_2O_8$.

The oxidative polymerization is preferably carried out under an inert atmosphere as disclosed in EP-11453877 (Agfa Gevaert). The oxygen content of the reaction medium when the oxidizing agent, for example a salt of peroxydisulfate, is added to it is preferably less than 3 mg per liter, more preferably less than 1.5 mg/liter, most preferably less than 0.5 mg/liter.

The concentration of oxygen in the reaction medium can be regulated by any means, such as freeze-thaw techniques, prolonged bubbling of an inert gas such as Argon, Nitrogen or Helium though the reaction medium, consumption of oxygen in a sacrificial reaction under an inert gas blanket. The inert gas is preferably bubbled through the reaction medium until the polymerization is completed thereby maintaining the oxygen concentration below 3 mg/l.

The oxidative polymerization is preferably carried out at low pH, as disclosed in EP-A 1384739 (Heraeus). The pH is preferably 1.5 or less, more preferably 1.00 or less.

To adjust the pH, an acid is preferably selected from the group of water-soluble inorganic acids and water-soluble organic acids. Examples of inorganic acids are hydrochloric acid, sulfuric acid, nitric acid and phosphoric acid. Examples of organic acids include p-toluenesulfonic acid, benzenesulfonic acid, methanesulfonic acid and trifluoromethanesulfonic acid.

The temperature of the reaction mixture is preferably between 0 to 100° C., more preferably between 0 to 50° C., most preferably between 5 and 30° C.

The amount of thiophene monomers and polyanions in the reaction mixture are chosen so that stable polythiophene/polyanion dispersions are obtained of which the solid content is preferably from 0.05 to 25 wt %, more preferably from 0.1 to 10 wt %, most preferably from 0.8 to 2 wt %.

After the polymerization reaction is completed the liquid composition may be further purified, for example by means of filtration, in particular by means of ultrafiltration, and/or by a treatment with ion exchanger, in particular by a treatment with an anion exchanger and a cation exchanger.

After the purification step, the conductive polymer dispersion may be further optimized for the application wherein it will be used. For example, when used for preparing a polymer capacitor, a polymer capacitor formulation described below may be prepared from the conductive polymer dispersion.

Various homogenization techniques may be used during the preparation of the conductive polymer. The homogenizing techniques may be selected from:

- ultrasonic homogenization techniques;
- pressure homogenization techniques; and
- mechanical homogenization techniques.

Preferred mechanical homogenizers are rotor-stator homogenizers and blade type homogenizers. Another mechanical homogenization technique may be the use of a spinning disk reactor.

Preferred high-pressure homogenizers, such as for example a Gaulin homogenizer or an Ariete homogenizer, force the dispersion through a very narrow channel or orifice under pressure. Another preferred high-pressure homogenizer is a microfluidizer.

Two or more homogenizers may be used in combination, preferably in a consecutive way.

The homogenization techniques may be used before, during and after the polymerization reaction. These homogenization techniques may also be used during the preparation of the liquid formulation described below.

Liquid Formulation

Depending on the application wherein the conductive polymer dispersion is used additional ingredients may be added to the conductive polymer dispersion thereby forming a liquid formulation optimized for the application.

For example when used to prepare a polymer capacitor, such a liquid formulation may be referred to as a polymer capacitor formulation.

All or part of the additional ingredients described below may be added to the conductive polymer dispersion referred to above.

In addition to the conductive polymer and the polyanion described above the formulation may comprise further additives such as surface-active substances, adhesion promoters, crosslinking agents, binders, conductivity increasing compounds, heat- and moisture-stability improving compounds, acidic compounds and alkaline compounds.

The surface-active compounds may be:

- anionic surfactants such as alkylbenzenesulphonic acids and salts, paraffin sulphonates, alcohol sulphonates, ether sulphonates, sulphosuccinates, phosphate esters, alkyl ether carboxylic acids or carboxylates;
- cationic surfactants such as quaternary alkylammonium salts;
- nonionic surfactants such as linear alcohol ethoxylates, oxo alcohol ethoxylates, alkylphenol ethoxylates or alkyl polyglucosides; and
- zwitterionic surfactants such as compounds comprising both a carboxylic acid group and a quaternary ammonium group, for example lauryl-N,N-(dimethyl-ammonio)-butyrate and lauryl-N,N-(dimethyl)-glycine-betaine; compounds comprising both a sulfuric acid group and quaternary ammonium group, for example 3-[(3-cholamido-propyl)dimethylammonio]-1-propanesulfonate, 3-(4-tert-butyl-1-pyridinio)-1-propanesulfonate, 3-(1-pyridinio)-1-propanesulfonate and 3-(benzyl-dimethyl-ammonio)propanesulfonate; compounds comprising both a phosphoric acid group and a quaternary ammonium group, for example with hexadecyl phosphocholine; compounds comprising a quaternary ammonium group with an attached hydroxy group, for example lauryldimethylamine N-oxide; and phospholipids, which consist of a quaternary ammonium head coupled via a phosphate group and glycerol to two hydrophobic fatty acids.

Particular preferred surfactants are the commercially available surfactants available under the trademarks Dynol® and Zonyl®.

Preferred adhesion promoters are organofunctional silanes or hydrolysates thereof such as 3-glycidoxypropyltrialkoxysilane, 3-amino-propyltriethoxysilane, 3-mercaptopropyltrimethoxysilane, 3-methacryloxypropyltrimethoxysilane, vinyltrimethoxysilane or octyltriethoxysilane.

Preferred crosslinking agents are melamine compounds, blocked isocyanates, functional silanes such as tetraethoxysilane, alkoxysilane hydrolysates, such as tetraethoxysilane, epoxysilanes such as 3-glycidoxypropyltrialkoxysilane.

Preferred binders are polyurethanes, polyacrylates or polyolefins.

Preferred conductivity increasing are:

- compounds containing ether groups such as e.g. tetrahydrofuran;
- compounds containing lactone groups such as γ-butyrolactone or γ-valerolactone;
- compounds containing amide or lactam groups such as caprolactam, N-methylcaprolactam, N,N-dimethylacetamide, N-methylacetamide, formamide, N,N-dimethylformamide (DMF), N-methyl-formamide, N-methylformanilide, N-methyl-2-pyrrolidone (NMP), N-octylpyrrolidone, 2-pyrrolidone, N-butyl-pyrrolidone, and N-hydroxyethyl-pyrrolidon;
- sulphones and sulphoxides such as sulpholane (tetramethylene sulphone) or dimethylsulphoxide (DMSO);
- sugar or sugar derivatives such as arabinose, saccharose, glucose, fructose or lactose;
- di- or polyalcohols such as sorbitol, xylitol, mannitol, mannose, galactose, sorbose, gluconic acid or ethylene glycol, di- or tri(ethylene glycol), 1,1,1-trimethylolpropane, 1,3-propanediol, 1-,2-propane-diol, 1,5-pentanediol, 1,2,3-propanetriol, 1,2,4-butanetriol or 1,2,6-hexanetriol, aromatic di- or polyalcohols such as resorcinol.

Particularly preferred conductivity increasing compounds are selected from the groups consisting of N-methyl-pyrrolidinone, N-butyl-pyrrolidone, N-hydroxyethyl-pyrrolidone, DMSO, ethylene glycol and diethylene glycol.

Preferred stability improving compounds are gallic acid derivatives.

The polymer capacitor formulation may have a pH of from 1 to 14, more preferably a pH of from 1 to 8. For corrosion-sensitive dielectrics, such as aluminium oxides or niobium oxides, the polymer capacitor formulation preferably has a pH of from 2.5 to 8, in order not to damage the dielectric.

To adjust the pH bases or acids as described in WO2010/003874 on page 4, lines 13-32 are preferably used. These compounds do not impair the film formation of the polymer capacitor formulation and are not volatile at higher temperatures such as soldering temperatures. Preferred compounds are the bases 2-dimethylaminoethanol, 2,2'-iminodiethanol or 2,2',2"-nitrilotriethanol and the acid polystyrenesulphonic acid.

The viscosity of the polymer capacitor formulation is typically optimized as function of the application method and may be between 0.01 and 1 000 mPa·s (measured with a rheometer at 20° C. and a shear rate of 100 $s^{-1}$). Preferably, the viscosity is from 1 to 500 mPa·s, more preferably between from 1 to 250 mPa·s. In the case of the production of aluminium wound capacitors the viscosity is preferably from 1 to 200 mPa·s while in the production of tantalum electrolytic capacitors or aluminium stacked capacitors the viscosity is preferably from 1 to 50 mPa·s.

The adjustment of the viscosity can, for example, be accomplished by adding appropriate rheology modifiers as a further additive.

As mentioned above, the particle size of the dispersed conductive polymer may have an influence on the impregnation of the porous anode body. The median particle size ($d_{50}$) of the polythiophene/polyanion particles is preferably from 1 to 150 nm, more preferably from 2 to 50 nm, most preferably from 5 to 40 nm. The $d_{50}$ particle size is preferably measured by laser diffraction.

The solids content of polymer capacitor formulation is preferably from 0.01 to 20 wt %, more preferably from 0.1 to 15 wt %, most preferably from 0.25 to 10 wt %, in each case based on the total weight of the formulation.

Polymer Capacitor

A polymer capacitor, also referred to as a polymer electrolyte capacitor, is an electrolytic capacitor comprising a solid conductive polymer electrolyte.

Electrolytic capacitors use a chemical feature of some special metals, often referred to as so-called valve metals, that by anodic oxidation form an insulating oxide layer. By applying a positive voltage to the anode material in an electrolytic bath an oxide barrier layer with a thickness corresponding to the applied voltage may be formed. This oxide layer acts as the dielectric in the electrolytic capacitor. To increase the capacitors capacitance the anode surface is roughened and so the oxide layer surface also is roughened.

To complete the capacitor, a counter electrode has to match the rough insulating oxide surface. This is accomplished by the electrolyte, which acts as the cathode electrode of an electrolytic capacitor. In a polymer electrolyte capacitor, this counter electrode consists of one or more layers of a conductive polymer, preferably a polythiophene conductive polymer.

The main difference between the polymer capacitors is the anode material and its oxide used as the dielectric:

- Polymer tantalum electrolytic capacitors use high purity sintered tantalum powder as an anode with tantalum pentoxide ($Ta_2O_5$) as a dielectric; and
- Polymer aluminium electrolytic capacitors use a high purity and electrochemically etched (roughened) aluminium foil as an anode with aluminium oxide ($Al_2O_3$) as the dielectric.

The porous metal layer (anode) covered with its oxide layer (dielectric) is referred to herein as a porous anode body.

Method of Preparing Polymer Capacitor

The method of preparing the polymer capacitor according to the present inventions comprises the step of introducing the polymer capacitor formulation into at least part of a porous anode body.

The polymer capacitor formulation may be introduced into the porous anode body by any known process such as impregnation, dipping, pouring, dripping on, spraying, misting on, knife coating, brushing or printing, for example inkjet, screen or tampon printing.

Preferably, the polymer capacitor formulation is introduced into at least part of the porous anode body by dipping body into the polymer capacitor formulation and thus impregnating it with the liquid composition.

The dipping into or the impregnation with the liquid composition is preferably carried out for a period of from 1 second to 120 minutes, more preferably of from 5 seconds to 60 minutes, most preferably in a range of from 10 seconds to 15 minutes. The introduction of the liquid composition into the anode body can be facilitated, for example, by increased or reduced pressure, vibration, ultrasound or heat.

After the porous anode bodies have been impregnated with the liquid composition, the solvent contained in the liquid composition is preferably, at least partially, removed to obtain a solid electrolyte which completely or partly covers the dielectric thereby forming a capacitor body. The coverage of the dielectric by the solid electrolyte is preferably at least 10%, more preferably at least 25%, most preferably at least 50%. The coverage may be as is described in DE-A-10 2005 043 828.

The solvent is preferably removed by removing the electrode body from the liquid composition and drying it. The drying step is preferably carried out at a temperature of from 20° C. to 260° C., more preferably of from 50° C. to 220° C., most preferably of from 80° C. to 200° C.

The dipping and the drying step may be repeated once or several times to adapt the thickness of the solid electrolyte layer deposited on the dielectric or the degree of filling of the electrolyte in the electrode body to the particular requirements.

It may be advantageous to use both self-doped and foreign-doped polythiophenes for the formation of the polymer cathode layer. Both types of polythiophene polymers may be combined in a single polymer capacitor formulation and introduced as described above. However, it is preferred that both types of polythiopenes are introduced in the capacitor using different polymer capacitor formulations each comprising a self-doped or a foreign-doped polythiophene. Preferably, first a self-doped polythiopene is introduced into the porous anode body followed by the introduction of the foreign-doped polythiophene. Using both self-doped and foreign-doped polythiophenes is disclosed in for example WO2014/048562 (Heraeus) and US2016/0351338 (AVX).

After the capacitor bodies have been produced in this manner, they can be further modified by the method and manner known to the person skilled in the art. In the case of a tantalum electrolytic capacitor, the capacitor bodies can be covered, for example, with a polymeric outer layer, as is described in DE-A-10 2004 022674 or DE-A-10 2009 007 594, and/or a graphite layer and a silver layer, as is known from DE-A-10 2005 043 828, while in the case of an aluminium wound capacitor, in accordance with the teaching of U.S. Pat. No. 7,497,879 B2, the capacitor body is incorporated into an aluminium beaker, provided with a sealing glass and firmly closed mechanically by crimping. The capacitor can then be freed from defects in the dielectric in a known manner by ageing.

EXAMPLES

Materials

All materials used in the following examples were readily available from standard sources such as ALDRICH CHEMICAL Co. (Belgium) and ACROS (Belgium) unless otherwise specified. The water used was deionized water.

4-vinylbenzenesulfonic acid, sodium salt commercially available from TCI Europe (Belgium).

INI-01 is 2,2'-Azobis[2-methyl-N-2-hydroxyethyl)propionamide] commercially available from Fujifilm (Belgium).

INI-02 is 2,2'-azobis[2-(2-imidazolin-2-yl)propane]dihydrochloride commercially available from Fujifilm (Belgium).

EDOT is 3,4-ethylenedioxythiophene commercially available from Heraeus.

PSS-1 is a 5.85 wt % aqueous solution of polystyrenesulfonic acid having a Mw of 300 kDa prepared according to a method disclosed in Houben-Weyl, Methoden der organischen Chemie, Vol. E 20, Makromolekulaire Stoffe, Teil 2 (1987), page 1141).

Methods

Viscosity Measurement

The viscosity was measured with a glass capillary viscometer.

Surface Resistance Measurement

The surface resistance SER was measured at room temperature using a two point probe method.

Particle Size Measurement

The median particle size was determined by laser diffraction analysis on a Malvern-Panalytical Mastersizer 3000.

Molecular Weight Measurement

The molecular weight of the polymers was determined by gel permeation chromatography (GPC) on a Waters e2695 alliance with a 2998A PDA detector, calibrated with polystyrene sulfonate standards. The molecular weight distribution is calculated with Waters Empower 3.

Nuclear Magnetic Resonance Measurement

The molar ratio of the copolymers was determined by nuclear magnetic resonance (NMR) on a JEOL ECZ400R with Royal probe in $D_2O$ (at=2.04"–d1=10"–nt=64–25 gr C–pw45).

Capacitance Measurement

The capacitance of a capacitor was measured at 120 Hz at room temperature with a potentiostat.

ESR Measurement

The equivalent series resistance (ESR) was measured at 100 kHz at room temperature with a potentiostat.

Example 1

Synthesis of Monomer I-2 ((4-vinylphenyl)methanesulfonate, Sodium Salt)

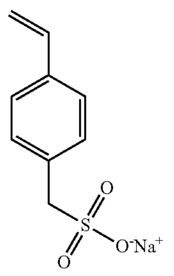

Sodium sulfite (22.72 g, 180 mmol) and 2,6-di-tert-butyl-4-methylphenol (0.79 g, 4 mmol) were dissolved in 144 mL water, blanketed by nitrogen. A solution of 1-(chloromethyl)-4-vinyl-benzene (20.35 g, 120 mmol) in acetone (114 mL) was added to the stirring reaction mixture. Next, the reaction mixture was refluxed for 6 hours. Afterwards, the reaction was cooled down to room temperature. The formed precipitate was filtered and washed with ethanol. The filtrate was concentrated in vacuo.

Both fractions were recrystallized in water/isopropanol (0.75/0.25), filtered and washed with acetone to obtain (4-vinylphenyl)methanesulfonate, sodium salt (23.4 g, 88.6%) as a white powder.

Synthesis of (1-(2-bromoalkyl)-4-ethenylbenzene) Intermediates 03 to 05

Intermediate-03

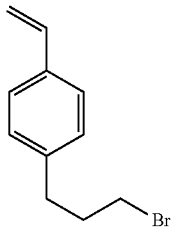

Intermediate-04

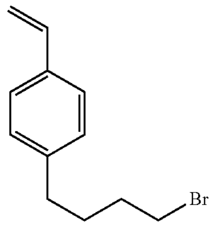

Intermediate-05

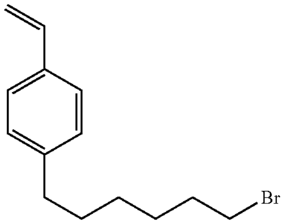

4-Bromostyrene (7.32 g, 40.0 mmol, 1 eq.) was dissolved in THF (133 mL) and stirred under a nitrogen atmosphere. The solution was cooled to −70° C. and n-butyllithium (2.5M in hexane, 16.80 mL, 42.0 mmol) was added dropwise. After stirring for 1 hour, a dibromoalkane reagent as shown in Table 4 was added (4 eq.) and the stirring reaction mixture was allowed to warm up to room temperature. The reaction mixture was further stirred for two hours. Afterwards, water was added (50 mL) and THF removed by rotary evaporation. The mixture was extracted with dichloromethane (2×50 mL). Then, butylhydroxytoluene (BHT, 0.09 g, 0.01 eq.) was added to the organic phase, it was washed with brine (50 mL), dried with magnesium sulfate and filtered. The remaining dichloromethane was removed by rotary evaporation.

The obtained mixture was purified by column chromatography (n-hexane/dichloromethane). The products were obtained as off-white solids. The exact quantities of the dibromoalkane reagents and the yield of the reactions after purification can be found in Table 4.

TABLE 4

| | Reagent | $m_{reagent}$ (g) | Yield (%) |
|---|---|---|---|
| Intermediate-03 | Dibromopropane | 32.30 | 26 |
| Intermediate-04 | Dibromobutane | 34.54 | 34 |
| Intermediate-05 | Dibromohexane | 39.02 | 46 |

Synthesis of ((4-vinylphenyl)alkane-sulfonate, Sodium Salt) Monomers I-3 to I-5

Monomer I-3

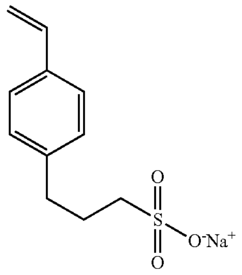

Monomer I-4

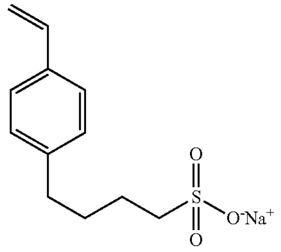

Monomer I-5

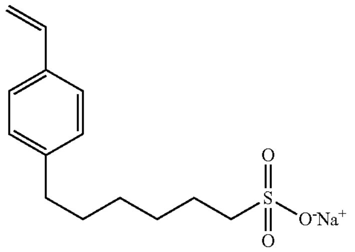

$Na_2SO_3$ and BHT were dissolved in water, blanketed by nitrogen. A solution of Intermediate-03 in acetone was added to the stirring reaction mixture. Next, the reaction mixture was refluxed for 6 hours. Afterwards, the reaction was cooled down to room temperature. The formed precipitate was filtered and washed with ethanol. In this way, Monomer I-3 was obtained as a white powder. The exact quantities used in the reactions and the yield of the reactions after purification can be found in Table 5.

For Monomer I-4, a solution of Intermediate-04 in acetone was used and the filtrate obtained after washing with ethanol was dried by rotary evaporation. Next, the obtained residue was treated with methyl-tert-butylether, filtered and dried.

For Monomer I-5, a solution of Intermediate-05 in acetone was used and the filtrate obtained after washing with ethanol was dried by rotary evaporation. Next, the obtained residue was treated with methyl-tert-butylether, filtered and dried.

TABLE 5

| Monomer | Intermediate | $M_{intermediate}$ (g) | $m_{Na2SO3}$ (g) | $M_{BHT}$ (g) | $V_{acetone}$ (mL) | $V_{water}$ (mL) | Yield (%) |
|---|---|---|---|---|---|---|---|
| I-3 | 03 | 2.25 | 1.70 | 0.06 | 9 | 9 | 63 |
| I-4 | 04 | 4.64 | 2.84 | 0.10 | 11 | 14 | 20 |
| I-5 | 05 | 4.75 | 3.03 | 0.11 | 12 | 15 | 24 |

Example 2

Preparation Polyanion-01(a) to Polyanion-01(g) Wherein X=1 and Y=0

Polyanion-01

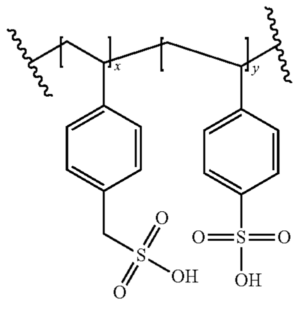

Polyanion-01(a)

3.89 g of Monomer I-2 (4-vinylphenyl)methanesulfonate, sodium salt) obtained in Example 1 was dissolved in 77.73 mL of water. The reaction mixture was stirred and heated to 90° C.

A 2 wt % solution of INI-01 in water was prepared and degassed with nitrogen for 1 hour. An amount of the initiator solution was added rapidly to the reaction mixture to result in an initiator concentration of 3.33 mol %. The solution was stirred for 20 hours at 90° C.

Then, the reaction mixture was treated twice with ion exchanger (30 g Lewatit® MonoPlus S 108 H, filtered and washed with 2×20 ml water).

This procedure yielded clear to slightly yellow solutions of Polyanion-01 (a) wherein x=1 in water.

Polyanion-01 (b)

Polyanion-01(b) synthesized as described for Polyanion-01(a) using 10.55 g of Monomer I-2 and 73.05 ml of water.

Polyanion-01 (c)

Polyanion-01 (c) was synthesized as described in Polyanion-01(a) using 5.22 g of Monomer I-2 and 30.92 mL of water.

Polyanion-01 (d)

Polyanion-01 (d) was synthesized as described in Polyanion-01(a) using a 2 wt % solution of INI-02, 4.00 g of Monomer I-2, 22.62 mL of water and a reaction temperature of 60° C.

Polyanion-01 (e)

Polyanion-01 (e) was synthesized as described in Polyanion-01 (a) using initiator concentration of 2.00 mol %, 5.22 g of Monomer I-2 and 35.46 mL of water.

Polyanion-01 (f)

Polyanion-01 (f) was synthesized as described in Polyanion-01 (a) using 5.22 g of Monomer I-2 and 30.92 mL of water.

Polyanion-01 (g)

Polyanion-01 (g) was synthesized as described in Polyanion-01 (a) using a 3.33 mol % solution of INI-02, 10.00 g of Monomer I-2 and 56.56 mL of water.

Example 3

Preparation of Polyanion-01(h) to Polyanion-01(j) with varying X and Y

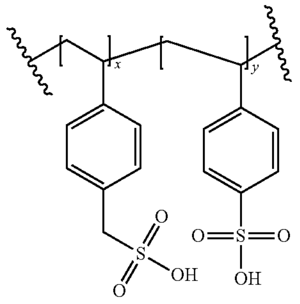

Polyanion-01(h)

5.77 g of 4-vinylbenzenesulfonic acid, sodium salt and 2.05 g of Monomer I-2 ((4-vinylphenyl)methanesulfonate, sodium salt) obtained in Example 1 were dissolved in 45.10 mL water. The reaction mixture was stirred and heated to 90° C.

A 2 wt % solution of INI-01 in water was prepared and degassed with nitrogen for 1 hour. An amount of the initiator solution was added rapidly to the reaction mixture to result in an initiator concentration of 3.33 mol %. The solution was stirred for 20 hours at 90° C.

Then, the reaction mixture was treated twice with ion exchanger (50 g Lewatit® MonoPlus S 108 H, filtered and washed with 2×50 ml water).

This procedure yielded a clear to slightly yellow solution of Polyanion-01(h) in water.

Polyanion-01(i)

Polyanion-01(i) was synthesized as described in Polyanion-01(h) using 3.77 g of 4-vinylbenzenesulfonic acid, sodium salt and 4.03 g of Monomer I-2 and 45.43 ml of water.

Polyanion-01(j)

Polyanion-01(j) was synthesized as described in Polyanion-01(h) using 1.85 g of 4-vinylbenzenesulfonic acid, sodium salt and 5.94 g of Monomer I-2 and 45.74 mL of water.

Example 4

Preparation of Polyanion-02 to Polyanion-04

Polyanion-02

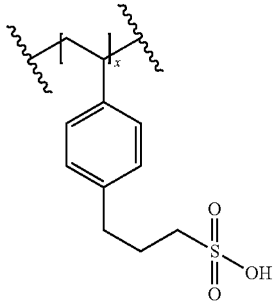

-continued

Polyanion-03

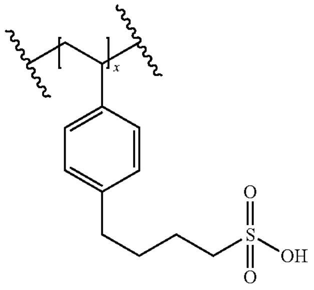

Polyanion-04

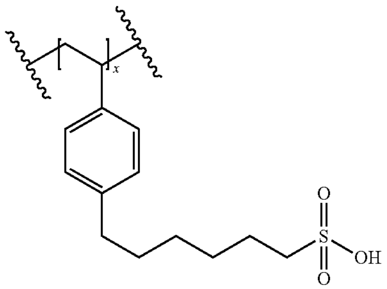

Polyanion-02

1.43 g of Monomer I-3 obtained in Example 1 was dissolved in 8.94 mL water. The reaction mixture was stirred and heated to 95° C.

A 2 wt % solution of INI-01 in water was prepared and degassed with nitrogen for 1 hour. An amount of the initiator solution was added rapidly to the reaction mixture to result in an initiator concentration of 3.33 mol %. The solution was stirred for 20 hours at 90° C.

Then, the reaction mixture was diluted with water (25 mL) and treated twice with ion exchanger (10 g Lewatit® MonoPlus S 108 H, filtered and washed with 2×10 mL water).

This procedure yielded a clear to slightly yellow solution of Polyanion-02 in water.

Polyanion-03

0.82 g of Monomer I-4 obtained in Example 1 was dissolved in 5.25 mL water. The reaction mixture was stirred and heated to 95° C.

A 2 wt % solution of INI-01 in water was prepared and degassed with nitrogen for 1 hour. An amount of the initiator solution was added rapidly to the reaction mixture to result in an initiator concentration of 3.33 mol %. The solution was stirred for 20 hours at 90° C.

Then, the reaction mixture was diluted with water (25 mL) and treated twice with ion exchanger (10 g Lewatit® MonoPlus S 108 H, filtered and washed with 2×10 mL water).

This procedure yielded a clear to slightly yellow solution of Polyanion-03 in water.

Polyanion-04

1.11 g of Monomer I-5 obtained in Example 1 was dissolved in 8.07 mL water. The reaction mixture was stirred and heated to 95° C.

A 2 wt % solution of INI-01 in water was prepared and degassed with nitrogen for 1 hour. An amount of the initiator solution was added rapidly to the reaction mixture to result in an initiator concentration of 3.33 mol %. The solution was stirred for 20 hours at 90° C.

Then, the reaction mixture was treated twice with ion exchanger (10 g Lewatit® MonoPlus S 108 H, filtered and washed with 2×15 mL water).

This procedure yielded a clear to slightly yellow solution of Polyanion-04 in water.

Example 5

The Molecular Weight (Mw) in kDa of Polyanion-01 (a) to Polyanion-01 (j), Polyanion-02, Polyanion-03 and Polyanion-04 was determined as described above. The results are shown in Table 6 together with the X/Y ratio measured by $^{1}$H-NMR and the concentration of the obtained polyanion solutions.

TABLE 6

| | X/Y | Mw (kDa) | Conc. (wt %) |
|---|---|---|---|
| Polyanion-01 (a) | 1/0 | 218 | 3.12 |
| Polyanion-01 (b) | 1/0 | 203 | 3.69 |
| Polyanion-01 (c) | 1/0 | 221 | 2.40 |
| Polyanion-01 (d) | 1/0 | 82 | 3.41 |
| Polyanion-01 (e) | 1/0 | 229 | 9.28 |
| Polyanion-01 (f) | 1/0 | 221 | 8.23 |
| Polyanion-01 (g) | 1/0 | 54 | 7.20 |
| Polyanion-01 (h) | 0.21/0.79 | 212 | 3.16 |
| Polyanion-01 (i) | 0.51/0.49 | 184 | 2.80 |
| Polyanion-01 (j) | 0.74/0.26 | 188 | 2.97 |
| Polyanion-02 | 1/0 | 367 | 1.88 |
| Polyanion-03 | 1/0 | 267 | 1.80 |
| Polyanion-04 | 1/0 | 217 | 1.39 |

Example 6

Preparation PEDOT/Polyanion-01(a) Dispersion

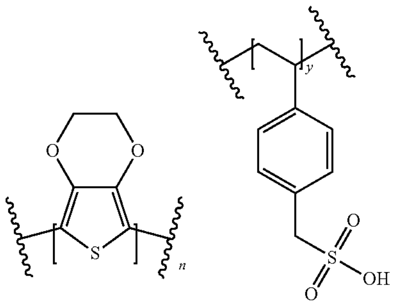

77.3 g of an aqueous solution of Polyanion-01 (a) obtained in Example 2, deionized water (147 mL), nitric acid (2.4 g, 2.72 mmol) are mixed in a reaction vessel. Iron(III) sulfate (0.09 g, 0.22 mmol) and sodium persulfate (1.78 g, 7.47 mmol) were added. The reaction mixture was stirred and cooled to 5° C. under nitrogen flow for 90 min. The oxygen level is below 30 ppb. 3,4-Ethylenedioxythiophene (EDOT) (0.96 g, 6.79 mmol) is added to the reaction mixture and it is stirred for 20 hours at 5° C. under nitrogen. The reaction mixture is treated with ion exchanger (65 g Lewatit® MonoPlus M600+35 g Lewatit® MonoPlus S 108 H, filtered and washed 3×25 mL water, repeated). The resulting viscous mixture was treated with high shear homogenization (Lab Gaulin, 4×600 bar). The dispersion is concentrated in vacuo. This procedure yielded a blue dispersion of PEDOT/Polyanion-01(a) in water (1.38 wt %).

Example 7

Preparation PEDOT/Polyanion-01(b) Dispersion

A polymerization was carried out in the same manner as in Example 6 except for using 88.7 g of Polyanion-01 (b) obtained in Example 2, 210 mL of deionized water, 3.1 g of nitric acid, 0.11 g of iron(III) sulfate, 2.26 g of sodium persulfate and 1.23 g of EDOT. The reaction mixture is treated with ion exchanger (77 g Lewatit® MonoPlus M600+42 g Lewatit® MonoPlus S 108 H, filtered and washed 3×30 mL water, repeated). This procedure yielded a blue dispersion of PEDOT:Polyanion-01(b) in water (1.15 wt %).

Example 8

Preparation PEDOT/Polyanion-01(c) Dispersion

A polymerization was carried out in the same manner as in Example 6 except for using 172.8 g of Polyanion-01(c) obtained in Example 2, 206 mL of deionized water, 3.9 g of nitric acid, 0.14 g of iron(III) sulfate, 2.86 g of sodium persulfate and 1.55 g of EDOT. The reaction mixture is treated with ion exchanger (100 g Lewatit® MonoPlus M600+55 g Lewatit® MonoPlus S 108 H, filtered and washed 2×50 mL water, repeated). This procedure yielded a blue dispersion of PEDOT/Polyanion-01(c) in water (1.28 wt %).

Example 9

Preparation PEDOT/Polyanion-01(d)

A polymerization was carried out in the same manner as in Example 6 except for using 83.2 g of Polyanion-01(d) obtained in Example 2, 176 mL of deionized water, 2.70 g of nitric acid, 0.10 g of iron(III) sulfate, 1.96 g of sodium persulfate and 1.06 g of EDOT. The reaction mixture is treated with ion exchanger (70 g Lewatit® MonoPlus M600+40 g Lewatit® MonoPlus S 108 H, filtered and washed 2×50 mL water, repeated). This procedure yielded a blue dispersion of PEDOT/Polyanion-01(d) in water (1.27 wt %).

Example 10

Preparation PEDOT/Polyanion-01 (e)

A polymerization was carried out in the same manner as in Example 6 except for using 191.7 g of Polyanion-01 (e) obtained in Example 2, 197 mL of deionized water, 4.0 g of nitric acid, 0.15 g of iron(III) sulfate, 2.94 g of sodium persulfate and 1.59 g of EDOT. The reaction mixture is treated with ion exchanger (100 g Lewatit® MonoPlus M600+55 g Lewatit® MonoPlus S 108 H, filtered and washed 2×50 mL water, repeated). This procedure yielded a blue dispersion of PEDOT/Polyanion-01 (e) in water (1.23 wt %).

Example 11

Preparation PEDOT/Polyanion-01 (f)

A polymerization was carried out in the same manner as in Example 6 except for using 131.9 g of Polyanion-01 (f) obtained in Example 2, 346 mL of deionized water, 5.0 g of nitric acid, 0.18 g of iron(III) sulfate, 3.62 g of sodium persulfate and 1.96 g of EDOT. The reaction mixture is treated with ion exchanger (125 g Lewatit® MonoPlus M600+66 g Lewatit® MonoPlus S 108 H, filtered and washed 2×50 mL water, repeated). This procedure yielded a blue dispersion of PEDOT/Polyanion-01 (f) in water (1.40 wt %).

Example 12

Preparation PEDOT/Polyanion-01 (g)

A polymerization was carried out in the same manner as in Example 6 except for using 134.9 g of Polyanion-01 (g) obtained in Example 2, 323 mL of deionized water, 4.8 g of nitric acid, 0.17 g of iron(III) sulfate, 3.47 g of sodium persulfate and 1.88 g of EDOT. The reaction mixture is treated with ion exchanger (120 g Lewatit® MonoPlus M600+65 g Lewatit® MonoPlus S 108 H, filtered and washed 2×50 mL water, repeated). This procedure yielded a blue dispersion of PEDOT/Polyanion-01 (g) in water (1.22 wt %).

Example 13

Preparation PEDOT/Polyanion-01 (h)

A polymerization was carried out in the same manner as in Example 6 except for using 110.8 g of Polyanion-01 (h) obtained in Example 3, 213 mL of deionized water, 3.48 g of nitric acid, 0.12 g of iron(III) sulfate, 2.53 g of sodium persulfate and 1.37 g of EDOT. The reaction mixture is treated with ion exchanger (90 g Lewatit® MonoPlus M600+50 g Lewatit® MonoPlus S 108 H, filtered and washed 2×50 mL water, repeated). This procedure yielded a blue dispersion of PEDOT/Polyanion-01 (h) in water (1.23 wt %).

Example 14

Preparation PEDOT/Polyanion-01 (i)

A polymerization was carried out in the same manner as in Example 6 except for using 125.7 g of Polyanion-01 (i) obtained in Example 3, 198 mL of deionized water, 3.43 g of nitric acid, 0.12 of iron(III) sulfate, 2.50 g of sodium persulfate and 1.35 g of EDOT. The reaction mixture is treated with ion exchanger (90 g Lewatit® MonoPlus M600+50 g Lewatit® MonoPlus S 108 H, filtered and washed 2×50 mL water, repeated). This procedure yielded a blue dispersion of PEDOT/Polyanion-01 (i) in water (1.38 wt %).

Example 15

Preparation PEDOT/Polyanion-01 (i)

A polymerization was carried out in the same manner as in Example 6 except for using 119.2 g of Polyanion-01 (j) obtained in Example 3, 205 mL of deionized water, 3.39 g of nitric acid, 0.12 g of iron(III) sulfate, 2.46 g of sodium persulfate and 1.34 g of EDOT. The reaction mixture is treated with ion exchanger (90 g Lewatit® MonoPlus M600+45 g Lewatit® MonoPlus S 108 H, filtered and washed 2×50 ml water, repeated). This procedure yielded a blue dispersion of PEDOT/Polyanion-01 (j) in water (1.32 wt %).

Example 16

Preparation PEDOT/Polyanion-02

A polymerization was carried out in the same manner as in Example 6 except for using 22.6 g of Polyanion-02 obtained in Example 4, 14.8 mL of deionized water, 0.35 g of nitric acid, 0.013 g of iron(III) sulfate, 0.25 g of sodium persulfate and 0.14 g of EDOT. The reaction mixture is treated with ion exchanger (10 g Lewatit® MonoPlus M600+5 g Lewatit® MonoPlus S 108 H, filtered and washed 2×15 mL water, repeated). This procedure yielded a blue dispersion of PEDOT/Polyanion-02 in water (1.00 wt %).

Example 17

Preparation PEDOT/Polyanion-03

A polymerization was carried out in the same manner as in Example 6 except for using 24.3 g of Polyanion-03 obtained in Example 4, 13.6 mL of deionized water, 0.34 g of nitric acid, 0.012 g of iron(III) sulfate, 0.25 g of sodium persulfate and 0.13 g of EDOT. The reaction mixture is treated with ion exchanger (10 g Lewatit® MonoPlus M600+5 g Lewatit® MonoPlus S 108 H, filtered and washed 2×15 mL water, repeated). This procedure yielded a blue dispersion of PEDOT/Polyanion-03 in water (1.32 wt %).

Example 18

Preparation PEDOT/Polyanion-04

A polymerization was carried out in the same manner as in Example 6 except for using 46.6 g of Polyanion-04 obtained in Example 4, 8.2 mL of deionized water, 0.45 g of nitric acid, 0.016 g of iron(III) sulfate, 0.33 g of sodium persulfate and 0.18 g of EDOT. The reaction mixture is treated with ion exchanger (12 g Lewatit® MonoPlus M600+6 g Lewatit® MonoPlus S 108 H, filtered and washed 2×15 mL water, repeated). This procedure yielded a blue dispersion of PEDOT/Polyanion-04 in water (1.90 wt %).

Comparative Example 1: Preparation PEDOT/PSS-1

73.3 g of PSS-1, deionized water (325 mL), and nitric acid (4.3 g, 48.3 mmol) were mixed in a reaction vessel.

Iron(III) sulfate (0.16 g, 0.39 mmol) and sodium persulfate (3.16 g, 13.3 mmol) were added. The reaction mixture was stirred and cooled to 5° C. under nitrogen flow. The oxygen level was below 30 ppb.

EDOT (1.71 g, 12.1 mmol) was added to the reaction mixture and stirred for 20 hours at 5° C.

The reaction mixture was then treated with ion exchanger (110 g Lewatit® MonoPlus M600+60 g Lewatit® MonoPlus S 108 H, filtered and washed 2×50 mL water, repeated). The resulting viscous mixture was treated with high shear homogenization (Lab Gaulin, 4×600 bar).

After a concentration step in vacuo a 1.12 wt % blue dispersion of PEDOT/PSS-1 (a) in water was obtained.

Comparative Example 2: Preparation PEDOT/PSS-1

A polymerization was carried out in the same manner as in Comparative Example 1. This procedure yielded a blue dispersion of PEDOT/PSS-1 (b) in water (1.22 wt %) and the pH level was modified to 3.16 with 2-dimethyl-amino-ethanol.

Comparative Example 3: Preparation PEDOT/PSS-1

A polymerization was carried out in the same manner as in Comparative Example 1 with 2.06 g of EDOT, 88.7 g of PSS-1, 389 mL of deionized water, 14.3 g of nitric acid, 0.094 g of iron(III) sulfate, 3.48 g of sodium persulfate, 130 g of Lewatit® MonoPlus M600 and 70 g of Lewatit® MonoPlus S 108 H. This procedure yielded a blue dispersion of PEDOT/PSS-1 (c) in water (1.15 wt %).

Example 19

The particle size (ϕ) of the dispersions according to Table 7 and the SER of bar-coated films of these dispersions on PET are shown in Table 7.

TABLE 7

| | ϕ (nm) | SER (Ω/□) |
|---|---|---|
| PEDOT/Polyanion-01 (a) | 22 | 78 |
| PEDOT/Polyanion-01 (b) | — | 87 |
| PEDOT/Polyanion-01 (c) | — | 88 |
| PEDOT/Polyanion-01 (d) | — | 60 |
| PEDOT/Polyanion-01 (e) | — | 87 |
| PEDOT/Polyanion-01 (f) | — | 55 |
| PEDOT/Polyanion-01 (g) | — | 73 |
| PEDOT/Polyanion-01 (h) | 24 | 75 |
| PEDOT/Polyanion-01 (i) | 28 | 66 |
| PEDOT/Polyanion-01 (j) | 28 | 68 |
| PEDOT/Polyanion-02 | — | 239 |
| PEDOT/Polyanion-03 | — | 590 |
| PEDOT/Polyanion-04 | — | 449 |
| PEDOT/PSS-1 (a) | — | 59 |
| PEDOT/PSS-1 (b) | 21 | 58 |
| PEDOT/PSS-1 (c) | — | 66 |

It is clear from Table 7 that the particle size of PEDOT dispersions comprising a polyanion according to the present invention is comparable with the particle size of conventional PEDOT/PSS dispersions. This also applies to the SER of coatings from these dispersions, except for Polyanion-02, 03 and 04 which were not studied further.

Example 20

The polymer dispersions according to Table 8 were bar coated on a PET substrate. The coated films were then stored at 60° C./95% RH, 85° C./85% RH and 105° C./dry during 500 hours. The ratio of the SER of the fresh and the stored films (Δ SER (time)) are given in Table 8.

TABLE 8

| | Δ SER (time) | | |
|---|---|---|---|
| | 60° C./ 95% RH | 85° C./ 85% RH | 105° C./ dry |
| PEDOT/Polyanion-01 (a) | 1.15 | 1.28 | 1.06 |
| PEDOT/Polyanion-01 (b) | 0.92 | 1.17 | 1.10 |
| PEDOT/Polyanion-01 (h) | 1.31 | 1.09 | 1.07 |
| PEDOT/Polyanion-01 (i) | 1.32 | 1.07 | 1.10 |
| PEDOT/PSS-1 (a) | 1.46 | 1.28 | 1.15 |

It is clear from the results in Table 8 that films prepared from dispersions wherein a polyanion according to the present invention is used are more stable when stored in high temperature/high relative humidity (RH) conditions.

Example 21

A pH study was performed in which the pH was altered from the starting pH of the dispersions with 2-dimethyl-amino-ethanol to a pH level between 4 and 6 (the end pH mentioned in Table 9). At both the start pH and the end pH, the median particle size in the dispersion was measured and a conductive layer was prepared on PET with a bar coater of which the SER was measured.

Table 9 shows the ratio of the median particle size of the dispersion at the end pH to the median particle of the dispersion at the start pH [ϕ pH(end)/ϕ pH(start)].

Table 9 also shows the ratio of the SER of the coated layers of dispersions at both the start and the end pH (Δ SER (pH)).

TABLE 9

| | pH (end) | Δ ϕ (pH) | Δ SER (pH) |
|---|---|---|---|
| PEDOT/Polyanion-01 (c) | 5.80 | 0.78 | 1.00 |
| PEDOT/Polyanion-01 (h) | 5.54 | 1.13 | 1.13 |
| PEDOT/Polyanion-01 (i) | 5.65 | 1.04 | 1.11 |
| PEDOT/Polyanion-01 (j) | 5.67 | 1.21 | 1.14 |
| PEDOT/PSS-1 (b) | 4.91 | 1.24 | 1.24 |

It is clear from the results in Table 9 that the dispersions wherein a polyanion according to the present invention is used are more stable as function of an increasing pH compared to conventional PEDOT/PSS dispersions.

Example 22: Preparation of a Capacitors

A chemically converted aluminum foil including an etching layer on a surface was prepared as a valve metal base. A dielectric layer was formed to cover the aluminum foil. The resulting chemically converted aluminum foil was used as an anode component. The rated voltage of the alumina layer is 90 V and the capacitance is 6.4 μF/cm$^2$. A 20 μm thick sold mask was printed on the Al foil with arrays of openings of 10 mm×10 mm. The patterned foil was cut to 30 mm×105 mm strips with 5 openings on them.

The conductive polymer dispersions used in the manufacturing of the capacitors were formulated with water, diethyleneglycol and DYNOL™ 604 and treated with an ultrasound homogenization step prior to coating of the aluminum foils.

The strip was then dip-coated with PEDOT/Polyanion-01 (e) dispersion and dried at 150° C. for 5 minutes. The dip-coating and curing steps were repeated for several times. Then, carbon paste and silver paste were sequentially screen-printed on the PEDOT layer and cured.

Additional capacitors were prepared and measured as described above where PEDOT/Polyanion-01 (f), PEDOT/Polyanion-01 (g) and PEDOT/PSS-1 (c) were used as conductive polymer dispersions.

In Table 10 the results of the capacitor evaluation are summarized.

TABLE 10

| | Capacitance (μF) | ESR (mΩ) |
|---|---|---|
| PEDOT/Polyanion-01 (e) | 5.8 | 72.0 |
| PEDOT/Polyanion-01 (f) | 6.2 | 88.6 |
| PEDOT/Polyanion-01 (g) | 5.6 | 88.0 |
| PEDOT/PSS-1 (c) | 4.9 | 97.0 |

It is clear from the results in Table 10 that the dispersions wherein a polyanion according to the present invention is used, the capacitance of the capacitors is higher while the ESR is lower.

The invention claimed is:

1. A conductive polymer dispersion comprising a polythiophene and a polyanion, characterized in that the polyanion is a homo- or copolymer of a monomer according to Formula I, Formula I

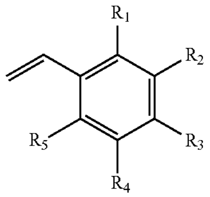

wherein each of $R_1$ to $R_5$ is independently selected from the group consisting of hydrogen, a halogen, an ether, and a substituted or unsubstituted alkyl group with the proviso that at least one of $R_1$ to $R_5$ is a substituent according to Formula II, Formula II

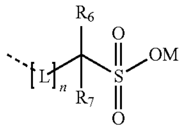

wherein L represents a divalent linking group having less than 20 carbon atoms;

n represents 0 or 1;

$R_6$ and $R_7$ are each independently selected from the group consisting of hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group; or any of L, $R_6$, and $R_7$ represent the necessary atoms to form a 5 to 8 membered ring;

M represents hydrogen or a counterion to compensate the negative charge of the sulfonate group; and the dashed line represents a covalent bond to the phenyl ring of Formula I.

2. The conductive polymer dispersion of claim 1, wherein L is a substituted or unsubstituted $C_1$ to $C_{10}$ alkylene group.

3. The conductive polymer dispersion of claim 1, wherein n is 0.

4. The conductive polymer dispersion of claim 1, wherein $R_6$ and $R_7$ are hydrogen.

5. The conductive polymer dispersion of claim 1, wherein only one of $R_2$, $R_3$, and $R_4$ is a substituent represented by Formula II.

6. The conductive polymer dispersion of claim 1, wherein $R_3$ is a substituent represented by Formula II and $R_1$, $R_2$, $R_4$, and $R_5$ represent hydrogen.

7. The conductive polymer dispersion of claim 1, wherein M represents $H^+$ or $Na^+$.

8. The conductive polymer dispersion of claim 1, wherein the polythiophene and the polyanion are present as polythiophene/polyanion particles having a median particle size ($d_{50}$) measured by laser diffraction from to 5 to 40 nm.

9. A liquid formulation including the conductive polymer dispersion according to claim 1.

10. The liquid formulation of claim 9, wherein the formulation has a pH from 2 to 8.5.

11. The liquid formulation of claim 9, wherein the viscosity of the formulation is from 1 to 250 mPa·s measured with a rheometer at 20° C. and a shear rate of 100 $s^{-1}$.

12. The liquid formulation of claim 9, further comprising a conductivity increasing compound selected from the group consisting of N-methyl-pyrrolidinone, N-butyl-pyrrolidone, N-hydroxyethyl-pyrrolidone, DMSO, ethylene glycol, and diethylene glycol.

13. A method of preparing a polymer capacitor comprising a porous anode body including the step of introducing the liquid formulation according to claim 9 into at least part of the porous anode body.

14. A method of preparing an electronic device comprising applying the liquid formulation according to claim 9 in preparation of a conductive layer in the electronic device.

15. The method of claim 14, wherein the electronic device is selected from photoconductive cells, photoresistors, photoswitches, phototransistors, phototubes, IR detectors, photovoltaic device, solar cells, coating materials for memory storage devices, field effect resistance devices, anti-static films, biosensors, electrochromic devices, solid electrolyte capacitors, hybrid capacitors, super capacitors, energy storage devices, batteries, and electromagnetic shielding.

* * * * *